United States Patent
Eguchi et al.

(10) Patent No.: US 9,997,927 B2
(45) Date of Patent: Jun. 12, 2018

(54) POWER TRANSMISSION APPARATUS, CONTROL METHOD OF POWER TRANSMISSION APPARATUS, AND STORAGE MEDIUM

(71) Applicant: CANON KABUSHIKI KAISHA, Tokyo (JP)

(72) Inventors: Tadashi Eguchi, Tokyo (JP); Naoto Takahashi, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 255 days.

(21) Appl. No.: 14/937,531

(22) Filed: Nov. 10, 2015

(65) Prior Publication Data
US 2016/0141886 A1    May 19, 2016

(30) Foreign Application Priority Data
Nov. 18, 2014    (JP) .................. 2014-233802

(51) Int. Cl.
| H02J 5/00 | (2016.01) |
| H02J 7/02 | (2016.01) |
| H02J 50/12 | (2016.01) |
| H02J 7/00 | (2006.01) |
| H02J 50/60 | (2016.01) |

(52) U.S. Cl.
CPC .............. *H02J 5/005* (2013.01); *H02J 7/025* (2013.01); *H02J 50/12* (2016.02); *H02J 50/60* (2016.02); *H02J 2007/0001* (2013.01)

(58) Field of Classification Search
USPC ........................................................ 307/104
See application file for complete search history.

(56) References Cited

U.S. PATENT DOCUMENTS

| 2012/0293010 A1* | 11/2012 | Lee .......................... H02J 5/005 307/104 |
| 2013/0088091 A1* | 4/2013 | Yoda ........................ H02J 7/025 307/104 |
| 2017/0126064 A1* | 5/2017 | Lee .......................... H02J 50/12 |

FOREIGN PATENT DOCUMENTS

JP        2010-34080 A    2/2010

* cited by examiner

*Primary Examiner* — Jared Fureman
*Assistant Examiner* — Aqeel Bukhari
(74) *Attorney, Agent, or Firm* — Canon U.S.A., Inc. IP Division (57) ABSTRACT

A power transmission apparatus that wirelessly transmits power includes a detection unit that detects an object, an authentication unit that performs authentication processing including a determination whether the object detected by the detection unit is a power reception apparatus, a power transmission unit that wirelessly transmits power according to a result of the authentication processing performed by the authentication unit, a reception unit that receives a power transmission stop request, and a control unit that stops power transmission according to reception of the power transmission stop request and controls the authentication unit so that the authentication processing is not performed in a period from when the power transmission is stopped to when another object different from the object determined to be a power reception apparatus is detected by the detection unit.

13 Claims, 6 Drawing Sheets

POWER TRANSMISSION APPARATUS, CONTROL METHOD OF POWER TRANSMISSION APPARATUS, AND STORAGE MEDIUM

BACKGROUND

Field

Aspects of the present invention generally relate to a wireless power transmission technique.

Description of the Related Art

Conventionally, a wireless power transmission system is known which includes a power transmission apparatus that wirelessly transmits power and a power reception apparatus that receives power supplied from the power transmission apparatus. There are some wireless power transmission systems in which the power transmission apparatus stops transmission of power when detecting full charge of the power reception apparatus to which the power transmission apparatus transmits power.

Japanese Patent Application Laid-Open No. 2010-34080 describes that a power reception apparatus transmits a command indicating that the power reception apparatus is fully charged to a power transmission apparatus when the power reception apparatus reaches a fully charged state that is a state in which electric energy is fully stored in a storage battery or a capacitor. Japanese Patent Application Laid-Open No. 2010-34080 further describes a technique in which the power transmission apparatus stops the transmission of power to the power reception apparatus when the power transmission apparatus receives a command indicating that the power reception apparatus is fully charged from the power reception apparatus.

In the wireless power transmission system as described above, prior to the wireless power transmission, it is necessary to perform authentication processing between the power transmission apparatus and the power reception apparatus to confirm whether wireless power transmission methods used by the power transmission apparatus and the power reception apparatus correspond to each other.

However, if the power reception apparatus is still placed on the power transmission apparatus, which is a power transmissible range, even after the power reception apparatus is fully charged, the power transmission apparatus may start authentication processing again with the power reception apparatus that is fully charged.

For example, while the power transmission apparatus is transmitting power to the power reception apparatus, the power reception apparatus transmits a command for requesting stopping of the power transmission to the power transmission apparatus because the power reception apparatus is fully charged. The power transmission apparatus responds to receipt of the command for requesting stopping of the power transmission and stops the transmission of the power to the power reception apparatus. However, if the power reception apparatus is still placed in a power transmission range of the power transmission apparatus, the power transmission apparatus detects the power reception apparatus, so that the authentication processing is started again. In this case, for example, the power transmission apparatus receives a command indicating that the power transmission is unnecessary from the power reception apparatus during the authentication processing, so that the power transmission apparatus does not perform the wireless power transmission on the power reception apparatus. In this way, the power transmission apparatus may perform processing for unnecessary power transmission such as useless communication on the power reception apparatus to which the power transmission apparatus has already transmitted power and which is fully charged and does not need power transmission.

SUMMARY

A power transmission apparatus, which wirelessly transmits power, includes a detection unit that detects an object, an authentication unit that performs authentication processing including a determination whether the object detected by the detection unit is a power reception apparatus, a power transmission unit that wirelessly transmits power according to a result of the authentication processing, a reception unit that receives a power transmission stop request, and a control unit that stops power transmission performed by the power transmission unit according to reception of the power transmission stop request and controls the authentication unit so that the authentication unit does not perform the authentication processing in a period from when the power transmission is stopped to when another object different from the object determined to be a power reception apparatus is detected.

Further features of the present disclosure will become apparent from the following description of exemplary embodiments with reference to the attached drawings.

DESCRIPTION OF THE EMBODIMENTS

Figure 1A:
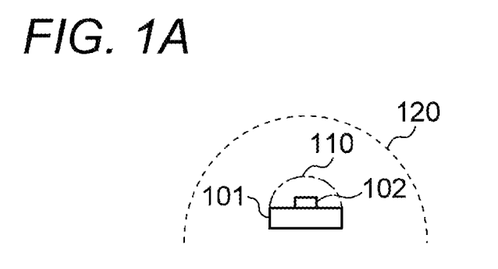
FIGS. 1A to 1C are system configuration diagrams of a wireless power transmission system.
Figure 1B:
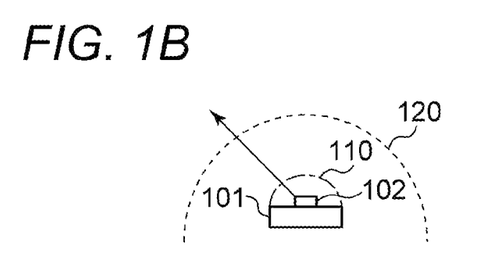
Figure 1C:
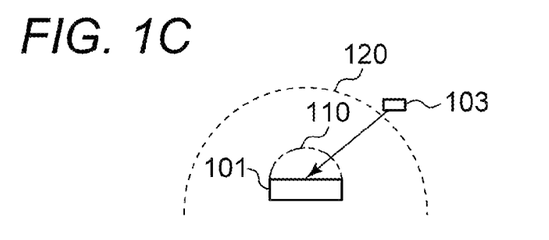

FIGS. 1A to 1C show a wireless power transmission system that performs wireless power transmission according to an embodiment. The wireless power transmission system according to the present embodiment performs the wireless power transmission by using a magnetic field resonance method. The magnetic field resonance method is a method of transmitting electric power by a coupling between a resonator (a resonance element) of a power transmission apparatus and a resonator (a resonance element) of a power reception apparatus due to resonance (sympathetic vibration) of magnetic field. While the wireless power transmission system using the magnetic field resonance method will be described as an example in the present embodiment, the wireless power transmission method (non-contact power transmission method) is not limited to the magnetic field resonance method, but a power transmission method using electromagnetic induction, electric field resonance, microwave, laser, or the like may be used.

In FIGS. 1A to 1C, reference numeral 101 denotes a power transmission apparatus, reference numeral 102 denotes a first power reception apparatus, and reference numeral 103 denotes a second power reception apparatus. The power transmission apparatus 101 is a power transmission apparatus that wirelessly transmits power. The first power reception apparatus 102 and the second power reception apparatus 103 are power reception apparatuses that receive power that is transmitted wirelessly. In the wireless power transmission system of the present embodiment, communication for performing authentication and communication of control information for controlling the wireless power transmission are performed between the power transmission apparatus and the power reception apparatuses. Examples of the control information include attributes (type of the device and the like) of the power reception apparatus, power receiving ability (maximum power receiving ability and the like), and feedback information of power receiving state (power value of power being received).

Hereinafter, transmission of power between the devices is represented as power transmission, power reception, or electric power transmission (wireless power transmission), and communication for authentication and communication of control information between the devices are simply represented as communication (wireless communication).

In FIGS. 1A to 1C, reference numeral 110 denotes a power transmittable range (a power transmission range) of the power transmission apparatus 101, reference numeral 120 denotes a communicable range (a communication range) of the power transmission apparatus 101. Radio wave frequency bands respectively used for the wireless power transmission and the wireless communication in the present embodiment are different from each other. As shown in FIG. 1A, in the wireless power transmission system of the present embodiment, the communicable range of the power transmission apparatus is larger than the power transmittable range of the power transmission apparatus. This is mainly derived from the fact that the ways of using the electromagnetic wave are different from each other. Usually, it is desired that the communication is possible in a wide range. For example, the wireless power transmission system is designed so that communication is possible in a wide range from a near place where attenuation of transmitted electromagnetic wave is small so that the electromagnetic wave attenuates to about $1/100$ to a distant place where attenuation of transmitted electromagnetic wave is large so that the electromagnetic wave attenuates to $1/1000000$ or less. On the other hand, in the power transmission, it is necessary to transmit the transmitted power efficiently as much as possible, so that, for example, when it is not possible to obtain a transmission efficiency of 50% or more between antennas, a countermeasure such as stopping the power transmission is taken. This is the reason of the above. When output power of radio wave for the wireless communication is reduced so that the communicable range of the wireless communication is the same as the power transmittable range of the wireless power transmission, the communication may not be performed correctly. Therefore, in the present wireless power transmission system, the output power of radio wave for the wireless communication is not reduced more than necessary as described above. As a result, the communicable range of the power transmission apparatus is larger than the power transmittable range of the power transmission apparatus.

Communication compatible with the Bluetooth (registered trademark) 4.0 standard is used as the communication performed between the devices of the wireless power transmission system of the present embodiment. In the Bluetooth (registered trademark) 4.0, a communication method called Bluetooth (registered trademark) Low Energy (BLE), which can perform communication with relatively small power consumption, is specified. In the present wireless power transmission system, the power transmission apparatus operates as a master which is specified by the BLE and is a key station of a network. The power transmission apparatus has to communicate with each of a plurality of power reception apparatuses to transmit power to the plurality of power reception apparatuses at once, so that the power transmission apparatus is caused to be operated as a master. The power reception apparatus operates as a slave, which is specified by the BLE and which connects to the master and performs communication based on control of the master.

While the communication in the present embodiment is assumed to be communication based on the BLE, the communication may be based on another communication standard. For example, the communication may be based on a wireless LAN (IEEE802.11 series), NFC (Near Field Communication), ZIGBEE, or the like. The communication may be based on an original communication method. While one power transmission apparatus and two power reception apparatuses are shown here, there may be two or more power transmission apparatuses and two or more power reception apparatuses.

FIG. 1A shows a case in which the first power reception apparatus 102 is placed on the power transmission apparatus 101. FIG. 1B shows a case in which the first power reception apparatus 102 is removed by a user after the power transmission apparatus 101 has transmitted power to the first power reception apparatus 102. FIG. 1C shows a case in which the second power reception apparatus 103 is placed on the power transmission apparatus 101 after the first power reception apparatus 102 is removed by the user.

Figure 2:
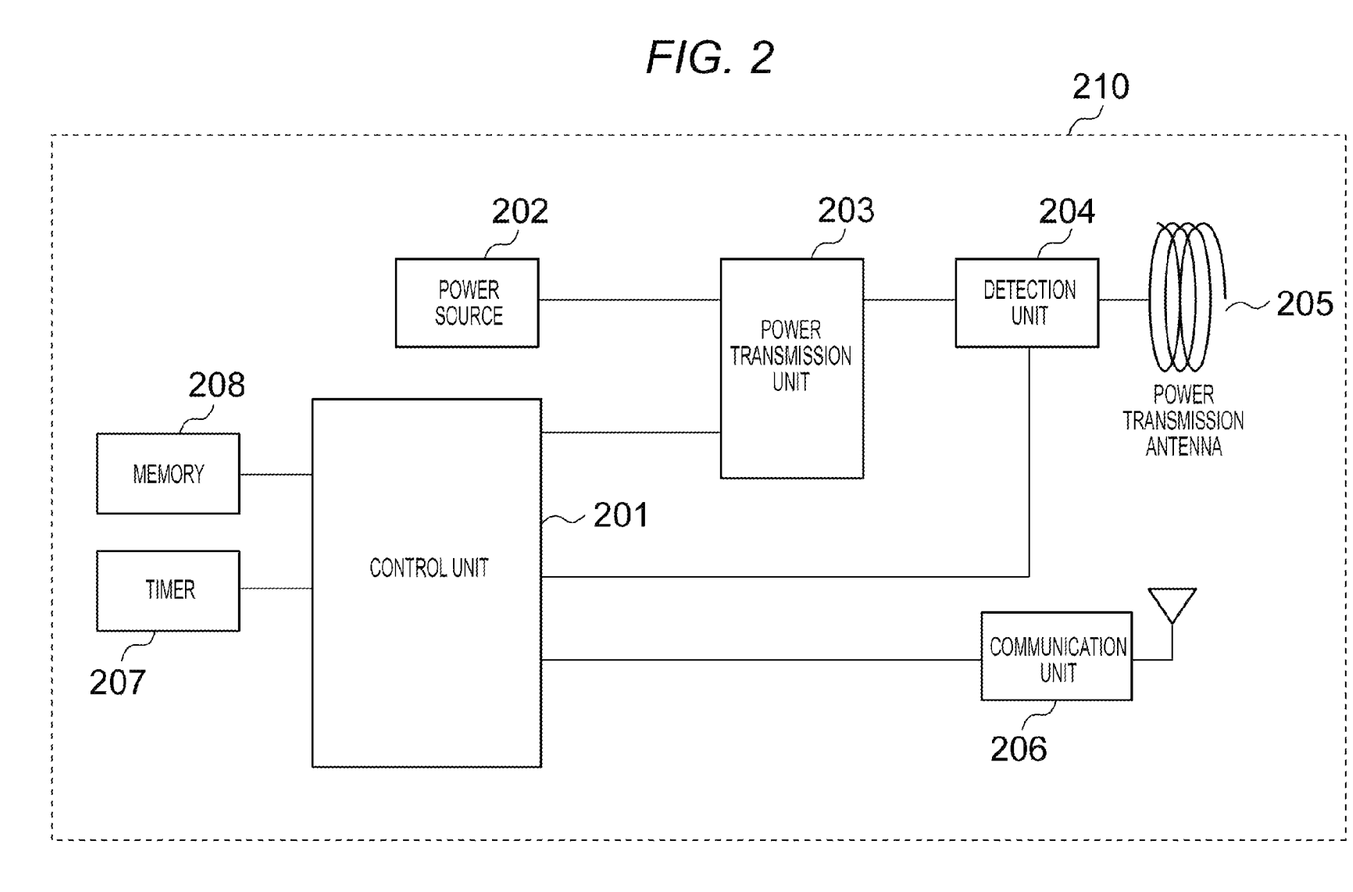
FIG. 2 is a diagram showing a configuration of a power transmission apparatus.

Subsequently, the configuration of the devices in the wireless power transmission system will be described. FIG. 2 is a diagram showing the configuration of the power transmission apparatus in the wireless power transmission system. In FIG. 2, reference numeral 210 denotes the entire power transmission apparatus (power transmission apparatus 101). Reference numeral 201 denotes a control unit that controls the power transmission apparatus 210. The control unit 201 is, for example, a central processing unit (CPU), and the CPU executes a control program stored in a memory 208 described later to control the entire device. Reference numeral 202 denotes a power source that supplies power when the power transmission apparatus 210 performs wireless power transmission. The power source 202 is a commercial power source or a battery. Reference numeral 203 denotes a power transmission unit that converts DC or AC power inputted from the power source 202 into AC frequency power in a transmission band and generates an electromagnetic wave to be received by a power reception apparatus through a power transmission antenna 205.

Reference numeral 204 denotes a detection unit that detects a voltage inputted into the power transmission antenna 205. The voltage detected by the detection unit 204 can be converted into power outputted from the power transmission antenna 205 to the power reception apparatus. The detection unit 204 may be configured to detect an input current value, an input power value, or an input impedance to the power transmission antenna 205. The detection unit 204 may be configured to detect at least any one of an input voltage, an input current, and an input power from the power source 202 to the power transmission unit 203.

It is possible to determine whether there is an object that receives the power outputted from the power transmission apparatus 210 by a detection value acquired by the detection unit 204. This is because the detection result of the detection unit 204 when there is no object in the power transmittable range is different from the detection result of the detection unit 204 when there is an object that consumes the transmitted power in the power transmittable range. As a detection method of an object located in the power transmittable range, the object may be detected by using sensor information of a pressure sensor, an optical sensor, an electrostatic capacitance sensor, or the like. The detection unit 204 may be configured to be included in the power transmission unit 203.

Reference numeral 206 denotes a communication unit for communicating with a power reception apparatus. The communication unit 206 includes a chip for controlling wireless communication based on the BLE and an antenna for transmitting a signal. The power transmission apparatus 210 is not limited to a device that performs only power transmission, but may be another device such as, for example, a printer and a PC.

Figure 3:
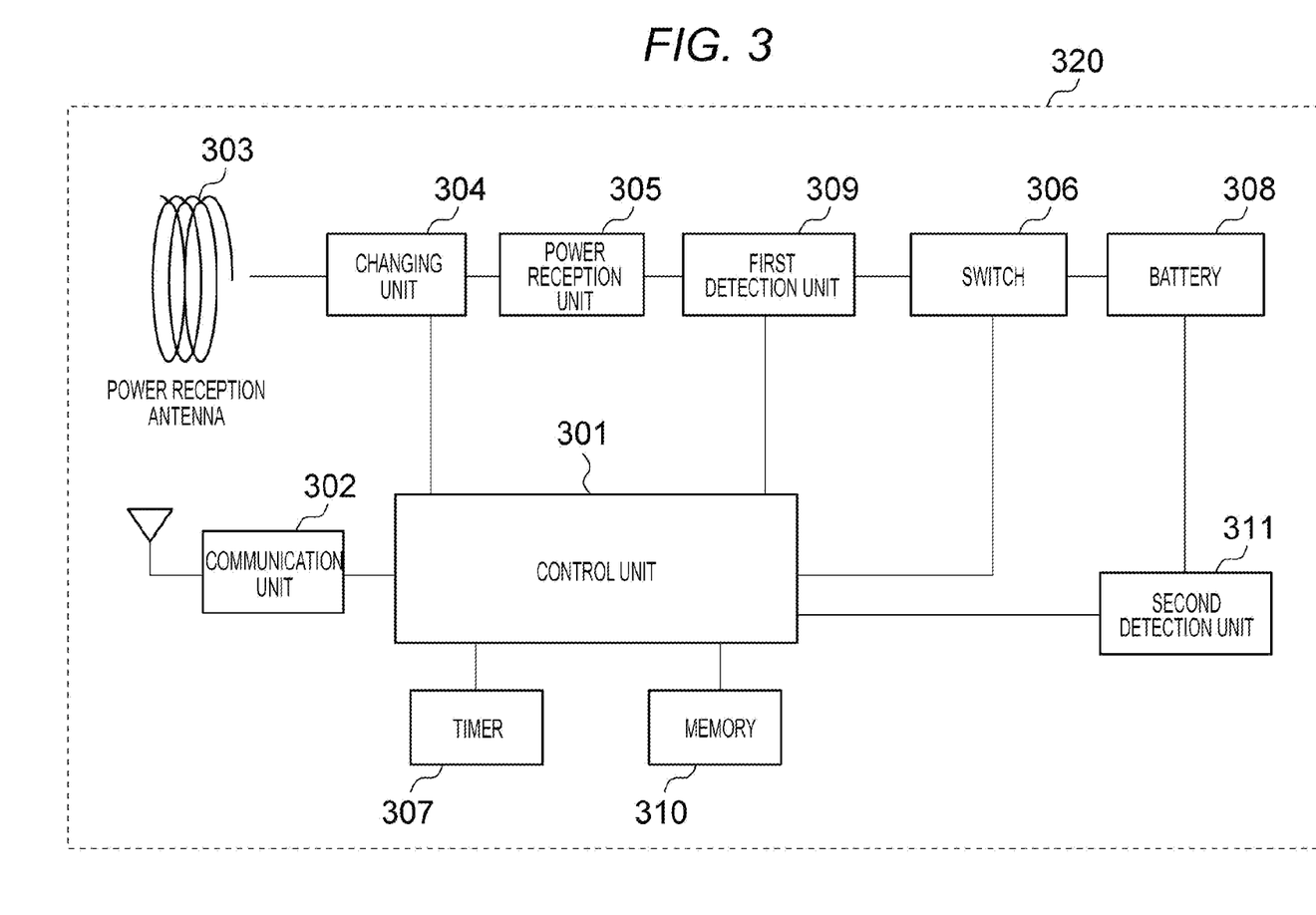
FIG. 3 is a diagram showing a configuration of a power reception apparatus.

Subsequently, the configuration of the power reception apparatus in the wireless power transmission system will be described using FIG. 3. In FIG. 3, reference numeral 320 denotes the entire power reception apparatus (the first power reception apparatus 102 or the second power reception apparatus 103). Reference numeral 301 denotes a control unit that controls the power reception apparatus 320. The control unit 301 is, for example, a CPU, and the CPU executes a control program stored in a memory 310 described later to control the entire device. Reference numeral 302 denotes a communication unit that communicates with the power transmission apparatus 210. The communication unit 302 includes a chip for controlling wireless communication based on the BLE and an antenna for transmitting a signal. Reference numeral 303 denotes a power reception antenna for receiving the wireless power transmission from the power transmission apparatus 210. Reference numeral 304 denotes a changing unit that changes impedance of the power reception antenna 303. The changing unit 304 adjusts the amount of receiving power that is outputted from the power transmission apparatus 210 by changing the impedance of the power reception antenna 303. The method for the changing unit 304 to adjust the amount of receiving power is performed by changing an impedance matching element value of the power reception antenna 303 and limiting the receiving current.

Reference numeral 305 denotes a power reception unit that generates power from an electromagnetic wave received by the power reception antenna 303. The power reception unit 305 operates as a rectifier that rectifies AC power obtained from the electromagnetic wave received by the power reception antenna 303 and also operates as a DC-DC converter that converts DC power obtained by the rectification into a voltage suitable to charge battery. Reference numeral 306 denotes a switch that performs input switching of the received power to a battery 308 that accumulates the received power. The battery 308 is a rechargeable battery and the received power is accumulated in the battery. Reference numeral 307 denotes a timer for measuring a predetermined time period. Reference numeral 309 denotes a first detection unit that detects the power received from the power transmission apparatus 210 by converting the power into a voltage value. Reference numeral 310 denotes a memory that stores various information. Reference numeral 311 denotes a second detection unit that detects a voltage of the battery 308. It is possible to detect a charging state of the battery 308 based on a detection result of the second detection unit 311.

The control unit 301 and the communication unit 302 of the power reception apparatus 320 may operate by using the power transmitted from the power transmission apparatus 210. By doing so, even when the power reception apparatus 320 does not have power necessary to start the wireless power transmission from the power transmission apparatus 210, the power reception apparatus 320 can start communication with the power transmission apparatus 210. Examples of the power reception apparatus 320 may be devices such as a digital camera and a mobile phone.

The configurations shown in FIGS. 2 and 3 are examples, and the power transmission apparatus 210 and the power reception apparatus 320 may respectively have hardware configurations other than the hardware configurations shown in FIGS. 2 and 3. For example, the power transmission apparatus 210 and the power reception apparatus 320 may have an operation unit for a user to input various data and operate the devices. Further, the power transmission apparatus 210 and the power reception apparatus 320 may include a display unit which has functions that can output visually recognizable information such as functions of LCD and LED and a function that can output sound such as a function of speaker and which performs various displays.

The communication between the power transmission apparatus and the power reception apparatus in the wireless power transmission system having the configuration as described above includes three phases, which are a detection phase, a communication establishment phase, and a power transmission phase.

In the detection phase, the power transmission antenna 205 is caused to intermittently generate an electromagnetic wave, so that power transmission (detection power transmission) for detecting the power reception apparatus 320 is intermittently performed. When an object is placed in the power transmittable range of the power transmission apparatus 210 while the detection power transmission is performed in the detection phase, the detection power transmission is supplied to the object. In this case, a load impedance as seen from the power transmission apparatus 210 varies, and a characteristic change in voltage or current appears in the power transmission apparatus 210. It is possible to detect that an object is placed in the power transmittable range of the power transmission apparatus 210 by detecting the variation of voltage or current in the power transmission apparatus 210. When the power transmission apparatus 210 detects that there is an object in the power transmittable area of the power transmission apparatus 210, the power transmission apparatus 210 starts power transmission (authentication power transmission) that supplies power required for authentication processing to the detected object. When the detected object is the power reception apparatus 320, the power value of the authentication power transmission is sufficient to start the control unit 301 and the communication unit 302 of the power reception apparatus 320.

The power reception apparatus 320 that receives the authentication power transmission transmits an advertisement packet for causing another device to transmit a communication connection request from the communication unit 302 within a predetermined period of time (for example, 100 ms) from when receiving the authentication power transmission. When the power transmission apparatus 210 receives the advertisement packet from the power reception apparatus 320 that responds to the authentication power transmission, the power transmission apparatus 210 determines that there is the power reception apparatus 320 in the power transmittable range.

The advertisement packet is a signal which is specified by the BLE and which is transmitted by broadcasting and includes information such as a device name of the device and a type of service to be provided. The advertisement packet is used to notify surrounding devices of the presence of the device and to notify that the device is waiting for connection from the surrounding devices. The advertisement packet from the power reception apparatus 320 may include service information indicating that the wireless power transmission method used by the present system can be performed. In the description below, the advertisement packet is referred to as a notification signal.

When the power transmission apparatus 210 does not receive the notification signal from the power reception apparatus 320 within a predetermined period of time (for example, 100 ms) from when starting the authentication power transmission, the power transmission apparatus 210 stops the authentication power transmission. Then, the power transmission apparatus 210 causes again the power transmission antenna 205 to intermittently generate an electromagnetic wave, so that the power transmission apparatus 210 intermittently performs the detection power transmission.

When the power transmission apparatus 210 detects the notification signal from the power reception apparatus 320 in the detection phase, the phase moves to the communication establishment phase. The power transmission apparatus 210 transmits a Connection Request packet (connection request) from the communication unit 206 to the power reception apparatus 320 which is the transmission source of the received notification signal. Then, the power transmission apparatus 210 establishes communication connection with the power reception apparatus 320 according to the transmitted connection request. Then, the authentication processing is performed between the devices by using the established communication connection. In the authentication processing, the power transmission apparatus 210 and the power reception apparatus 320 communicate (exchange) each other's capability information during the communication connection established between the power transmission apparatus 210 and the power reception apparatus 320. The capability information is, for example, the amount of power that can be transmitted and received, a hardware configuration, a method of power transmission that can be used, and a version of power transmission standard that can be used. By the authentication processing, the power transmission apparatus 210 can confirm that the object located in the power transmission range is a power reception apparatus that requests power transmission. On the other hand, by the authentication processing, the power reception apparatus 320 can check whether the power transmission apparatus that is communicably connected can perform supply of power. In the communication establishment phase, the power transmission apparatus 210 continuously performs the authentication power transmission and performs power transmission to cause the power reception apparatus 320 to perform communication required for communication connection and communication of the capability information.

When the power transmission apparatus 210 establishes the communication connection with the power reception apparatus 320 in the communication establishment phase and exchanges the capability information, the power transmission apparatus 210 moves to the power transmission phase. In the power transmission phase, the power transmission apparatus 210 transmits power higher than (greater than) the power of the detection power transmission and the authentication power transmission in the detection phase and the communication establishment phase to the power reception apparatus 320. In the power transmission phase, the power transmission apparatus 210 receives control information for controlling the wireless power transmission, such as a value of power being received, a request of increasing or decreasing the amount of transmitting power, and a halt of the power transmission, from the power reception apparatus 320 by using the communication unit 206. That is to say, in the power transmission phase, the power transmission apparatus 210 performs power transmission according to requests from the power reception apparatus 320. The power transmission phase ends when a signal for requesting a halt of the power transmission is transmitted from the power reception apparatus 320 to the power transmission apparatus 210 or an error occurs in the power transmission.

When the power transmission phase ends, the power transmission apparatus 210 starts the operation of the detection phase again. When the power transmission apparatus 210 starts the operation of the detection phase again, the power transmission apparatus 210 does not output the authentication power transmission unless the power transmission apparatus 210 detects a new object after the power reception apparatus 320 to which the power transmission apparatus 210 has transmitted power is removed. Alternatively, when the power transmission apparatus 210 starts the operation of the detection phase again, the power transmission apparatus 210 does not output the authentication power transmission unless the power transmission apparatus 210 detects the power reception apparatus 320, to which the power transmission apparatus 210 has transmitted power, and a new object other than the power reception apparatus 320. In other words, when the power transmission apparatus 210 starts the operation of the detection phase again after the power transmission phase, the power transmission apparatus 210 does not output the authentication power transmission only by detecting the power reception apparatus 320 to which the power transmission apparatus 210 has transmitted power, but the power transmission apparatus 210 outputs the authentication power transmission by detecting another object. Therefore, the power transmission apparatus 210 does not perform the authentication power transmission due to the power reception apparatus 320 to which the power transmission apparatus 210 has transmitted power, so that it is possible to reduce the possibility that the power transmission apparatus 210 communicably connects to the power reception apparatus 320 to which the power transmission apparatus 210 has already transmitted power and performs the authentication processing.

Figure 4:
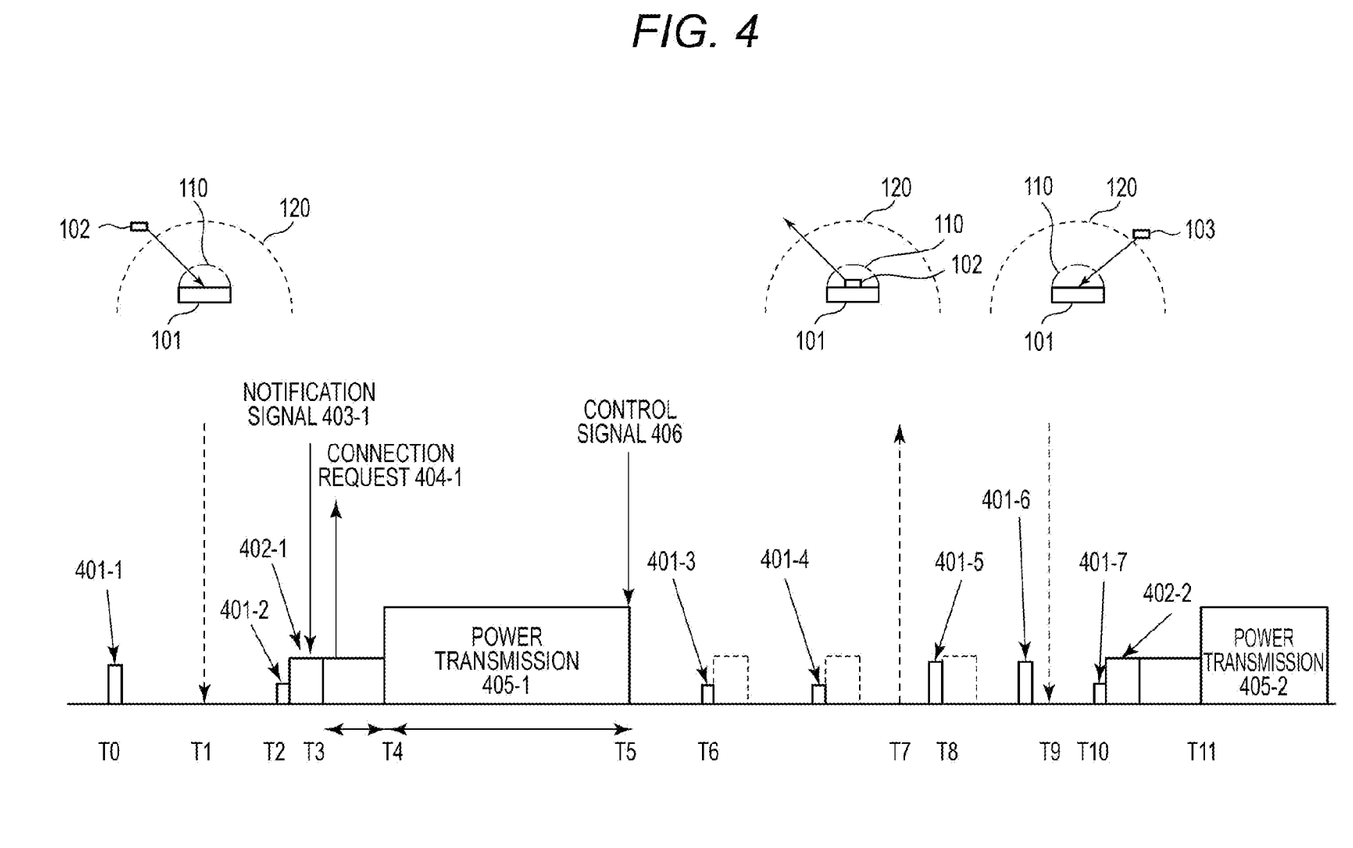
FIG. 4 is a diagram showing a sequence chart of the wireless power transmission system.

An operation of the wireless power transmission system that performs the wireless power transmission according to the present embodiment will be described with reference to a sequence chart shown in FIG. 4. FIG. 4 is a diagram for explaining an operation of the power transmission apparatus 101. The horizontal axis represents the elapse of time and the vertical axis represents a voltage detected by the detection unit 204 provided in the power transmission apparatus 101.

The power transmission apparatus 101 starts an operation of the detection phase when detecting power-on or an operation instruction from a user. In the detection phase, the power transmission apparatus 101 starts intermittent detection power transmission (401-1) from the power transmission antenna 205 at time T0. The period of the detection power transmission (from time T0 to time T2) may be an arbitrary value. The period in which the detection power transmission is performed may be randomly set for each power transmission apparatus. Further, the detection power transmission may be performed in a period different for each power transmission apparatus.

Here, the power transmission apparatus 101 stores a detection result aV of the detection unit 204 in the memory 208 at a detection power transmission time (401-1) in a steady state. The steady state is a state in which another device does not come close to or is not in contact with the power transmission apparatus 101 and is a state in which no device (object) consumes power outputted from the power transmission apparatus.

It is assumed that, at time T1, a user of the first power reception apparatus 102 places the first power reception apparatus 102 on the power transmission apparatus 101 which is within a power transmittable range of the power transmission apparatus 101 in order to receive power transmission. The power reception apparatus comes close to the power transmission apparatus 101, so that when the power transmission apparatus 101 outputs the detection power transmission at time T2, the detection unit 204 detects a voltage value bV lower than a voltage value in the steady state in the detection power transmission time.

When the power transmission apparatus 101 outputs power in a state in which there is an object in the power transmittable range, the outputted power is received (consumed) by the object, so that the detection unit 204 detects a value different from that in the steady state. When the value detected here is compared with the detection value aV of the detection unit 204 in the steady state and it is detected that the value detected here has decreased by a threshold value or more, it is determined that there is an object in the power transmission range.

For simplicity of description, an example is described in which the detection unit 204 detects a DC voltage that is not yet converted into AC power by the power transmission unit 203. The detection unit 204 may detect an amplitude of an AC voltage inputted into the power transmission antenna 205, an AC current value, or an input impedance of the power transmission antenna 205. The detection unit 204 may detect a DC current or power that are not yet converted into AC.

The power transmission apparatus 101 detects an object that comes close to the power transmission apparatus 101, so that the power transmission apparatus 101 starts the authentication power transmission (402-1). The power value of the detection power transmission may be different from that of the authentication power transmission, and the power value of the authentication power transmission may be higher than that of the detection power transmission.

When the first power reception apparatus 102 detects the authentication power transmission (402-1) from the power transmission apparatus 101, the first power reception apparatus 102 transmits a notification signal from the communication unit 302 within a predetermined period of time (for example, 100 ms) (403-1).

As the power used when the first power reception apparatus 102 transmits the notification signal, it is possible to use the power received by the first power reception apparatus 102 due to the detection power transmission. In this case, even when the power reception apparatus does not have enough power to transmit the notification signal, the power reception apparatus can communicate with the power transmission apparatus and can start the wireless power transmission.

The power transmission apparatus 101 receives the notification signal from the first power reception apparatus 102 before a predetermined period of time (for example, 100 ms) elapses after performing the authentication power transmission at 402-1, so that the power transmission apparatus 101 extends a period of the authentication power transmission for performing the communication establishment phase with the first power reception apparatus 102 by a period between T3 and T4. On the other hand, when the power transmission apparatus 101 does not receive the notification signal from the power reception apparatus before a predetermined period of time (for example, 100 ms) elapses after performing the authentication power transmission at 402-1, the power transmission apparatus 101 stops the authentication power transmission at time T3.

The power transmission apparatus 101 that receives the notification signal before the predetermined period of time elapses transmits a connection request to the first power reception apparatus 102 which is the transmission source of the received notification signal (404-1). The first power reception apparatus 102 communicably connects with the power transmission apparatus 101 in response to the connection request received from the power transmission apparatus 101. Thereafter, when the communication for the authentication processing in the communication establishment phase is completed between the power transmission apparatus 101 and the first power reception apparatus 102, the phase changes to the power transmission phase and the power transmission apparatus 101 performs power transmission to the first power reception apparatus 102 from time T4 (405-1). The first power reception apparatus 102 charges the battery 308 by using the power received in the power transmission phase. At time T5, if the first power reception apparatus 102 determines that the power reception becomes unnecessary from a detection result of the second detection unit 311, the first power reception apparatus 102 transmits a control signal requesting stop of the power transmission to the power transmission apparatus 101 from the communication unit 302 (406). A state in which the power reception becomes unnecessary is, for example, a state in which the battery 308 is fully charged (a state in which the amount of accumulated power remaining in the battery is enough).

The power transmission apparatus 101 that receives the control signal requesting stop of the power transmission stops the power transmission to the first power reception apparatus 102 in the power transmission phase and disconnects the communication with the first power reception apparatus 102.

The power transmission apparatus 101 completes the power transmission phase at time T5, and thereafter starts the operation of the detection phase again. Specifically, the power transmission apparatus 101 performs intermittent detection power transmission from the power transmission antenna 205 from time T6 (401-3, 401-4). At this time, even after the first power reception apparatus 102 becomes fully charged and the power reception is completed, the first power reception apparatus 102 is still placed in the power transmittable range of the power transmission apparatus 101. Here, even when the power transmission apparatus 210 of the present embodiment detects the power reception apparatus 320 that is still placed in the power transmittable range even after the power transmission phase ends, the power transmission apparatus 210 does not perform the authentication power transmission to the power reception apparatus 320.

In order not to perform the authentication power transmission to the power reception apparatus to which the power transmission has been performed, the power transmission apparatus 101 compares the detection value of the detection unit 204 at the detection power transmission time before the power transmission phase is started and the detection value of the detection unit 204 at the detection power transmission time immediately after the power transmission phase ends. In FIG. 4, in the power transmission apparatus 101, the detection results of the detection unit 204 at the detection power transmission time (401-3, 401-4) are substantially the same as the voltage value bV detected at time T2. The detection results of the detection unit 204 at the detection power transmission time (401-3, 401-4) are values different from aV in the steady state, so that the power transmission apparatus 101 recognizes that there is an object in the power transmittable range. However, when the detection results of the detection unit 204 before and after the power transmission phase are substantially the same value, the power transmission apparatus 101 determines that the first power reception apparatus 102 to which the power transmission was performed in the power transmission phase is still placed in the power transmittable range.

The power transmission apparatus 101 determines that the first power reception apparatus 102 is merely still placed in the power transmittable range and there is no intention to request the power transmission again, so that the power transmission apparatus 101 does not perform the authentication power transmission and does not advance to the communication establishment phase with the first power reception apparatus 102. In other words, the power transmission apparatus 101 does not perform the authentication power transmission even if the first power reception apparatus 102 is continuously placed in the power transmittable range. If the power transmission apparatus 101 does not perform the authentication power transmission, the notification signal is not transmitted from the first power reception apparatus 102 and the connection request is not transmitted from the power transmission apparatus 101, so that it is possible to limit unnecessary reconnection between the power transmission apparatus 101 and the first power reception apparatus 102.

Thereby, the possibility where reconnection is established between the first power reception apparatus 102 that does not require further power transmission and the power transmission apparatus 101 and unnecessary authentication processing is performed is reduced. In other words, the possibility where processing for unnecessary power transmission is performed to the first power reception apparatus 102 of which internal battery is fully charged because the power transmission has already been performed is reduced. Further, it is possible to reduce power consumption of each device because unnecessary processing is omitted.

Next, at time T7, it is assumed that the first power reception apparatus 102 is removed from the power transmittable range by a user. The power transmission apparatus 101 performs intermittent detection power transmission from the power transmission antenna 205 at time T8 after the first power reception apparatus 102 is removed from the power transmittable range by the user (401-5, 401-6). The detection result of the detection unit 204 when the detection power transmission 401-5 is performed is the voltage value aV in the steady state in the detection power transmission time. The detection result of the detection unit 204 is the voltage value aV in the steady state, so that the power transmission apparatus 101 recognizes that the first power reception apparatus 102 is removed. The power transmission apparatus 101 that recognizes that the first power reception apparatus 102 is removed changes control so as to perform an operation of a normal detection phase. In other words, the power transmission apparatus 101 performs the authentication power transmission when the detection result of the detection unit 204, which is detected when the detection power transmission is performed thereafter, is different from that of the steady state.

Here, it is assumed that, at time T9, a user of the second power reception apparatus 103 places the second power reception apparatus 103 on the power transmission apparatus 101 which is within the power transmittable range of the power transmission apparatus 101 in order to receive power transmission. The power reception apparatus comes close to the power transmission apparatus 101, so that when the power transmission apparatus 101 outputs the detection power transmission at time T10, the detection unit 204 detects a voltage value lower than a voltage in the steady state in the detection power transmission time. The power transmission apparatus 101 detects an object that comes close to the power transmission apparatus 101, so that the power transmission apparatus 101 starts the authentication power transmission (402-2).

Although detailed description and drawings will be omitted because these are described above, thereafter, the power transmission apparatus 101 and the second power reception apparatus 103 transmit and receive the notification signal and pass through the communication establishment phase, and at time T11, perform again the power transmission of the power transmission phase (405-2).

Figure 5:
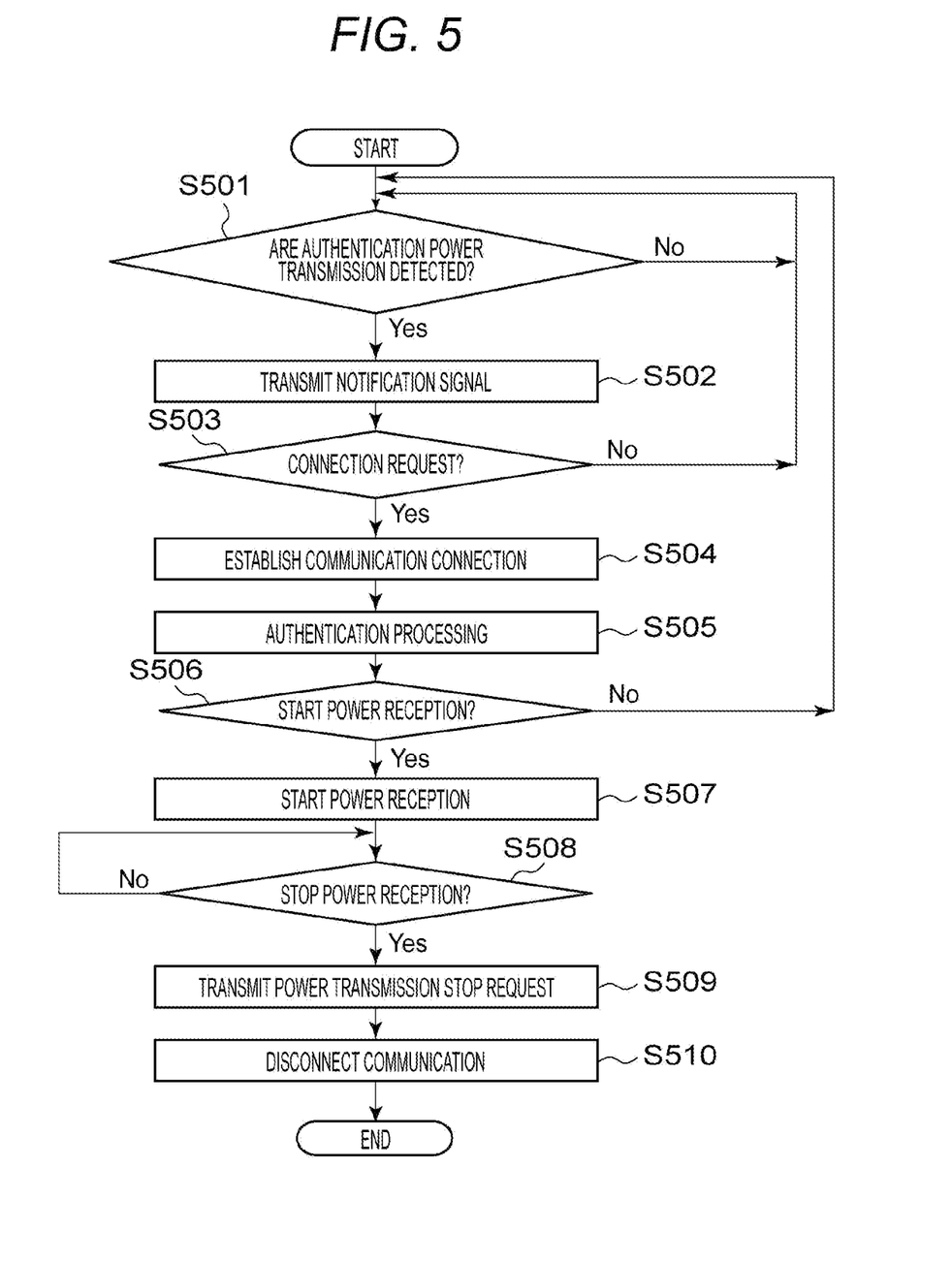
FIG. 5 is a flowchart showing an operation of the power reception apparatus.

Next, an operation of the power reception apparatus 320 of the present embodiment shown in FIG. 3 will be described with reference to a flowchart shown in FIG. 5. The flowchart shown in FIG. 5 is realized when the control unit 301 executes the control program stored in the memory 310 and performs calculation and processing of information and control of each hardware component. A part or all of steps shown in the flowchart shown in FIG. 5 may be realized by hardware such as, for example, application specific integrated circuit (ASIC).

When the power reception apparatus 320 starts an operation, the power reception apparatus 320 determines whether the authentication power transmission are detected through the power reception antenna 303 based on a detection result of the first detection unit 309 (S501). When the detection power transmission and the authentication power transmission are detected, the power reception apparatus 320 causes the control unit 301 and the communication unit 302 to operate by using received power or remaining power of the battery 308. Then, the power reception apparatus 320 causes the communication unit 302 to transmit a notification signal to notify of information of the power reception apparatus 320, such as information related to functions and services of the power reception apparatus 320 (S502). The notification signal is transmitted by broadcast in order to cause surrounding devices to transmit a connection request to the power reception apparatus 320 by using packets that can be transmitted before wireless connection is established. The transmission of the notification signal stops after a predetermined period of time elapses from when the detection power transmission becomes undetectable.

In FIG. 4, the first power reception apparatus 102 detects the authentication power transmission transmitted from the power transmission apparatus 101 between time T2 and time T3 (S501). Then, the first power reception apparatus 102 transmits a notification signal 403-1 (S502).

Let us return to the description of FIG. 5. The control unit 301 determines whether the communication unit 302 receives a connection request from the power transmission apparatus 210 after transmitting the notification signal (S503). S501, S502, and S503 are repeatedly performed until the connection request is received. In S503, if the control unit 301 determines that the communication unit 302 receives the connection request, the communication unit 302 establishes wireless communication connection with the power transmission apparatus 210 (S504).

Then, the communication unit 302 performs communication for exchange of information required for the authentication processing and the power transmission between the communication unit 302 and the connected power transmission apparatus 210 (S505). When the communication is not started until a predetermined period of time (for example, 5 seconds) elapses after the wireless communication connection is established, the communication with the connected power transmission apparatus 210 may be disconnected, and the processing may be returned to S501. The control unit 301 determines whether to start power reception (S506). For example, when the battery 308 is fully charged, the control unit 301 determines not to start the power reception because the power reception is not required. When the control unit 301 determines not to start the power reception, in the authentication processing, the control unit 301 causes the communication unit 302 to transmit control information indicating that the power reception is not started to the power transmission apparatus 210, disconnects the communication, and returns the processing to S501.

On the other hand, if the control unit 301 determines to start the power reception in step S506, when the communication for the authentication processing is completed, the power reception apparatus 320 causes the power reception unit 305 to receive the power transmission started by the power transmission apparatus 210 and charges the battery 308 with the received power (S507).

Thereafter, the control unit 301 determines whether to stop the power reception based on the detection result of the second detection unit 311 (S508). Here, if the control unit 301 detects that the battery 308 is fully charged from the detection result of the second detection unit 311, the control unit 301 determines to stop the power reception. When the control unit 301 determines to stop the power reception, the communication unit 302 transmits a control signal requesting the power transmission apparatus 210 to stop the power transmission (S509). In FIG. 4, the first power reception apparatus 102 performs power reception of the power transmission 405-1 from the power transmission apparatus 101, and thereafter transmits the control signal 406. Then, the first power reception apparatus 102 disconnects the communication with the power transmission apparatus 210 performed by the communication unit 302 (S510).

Figure 6:
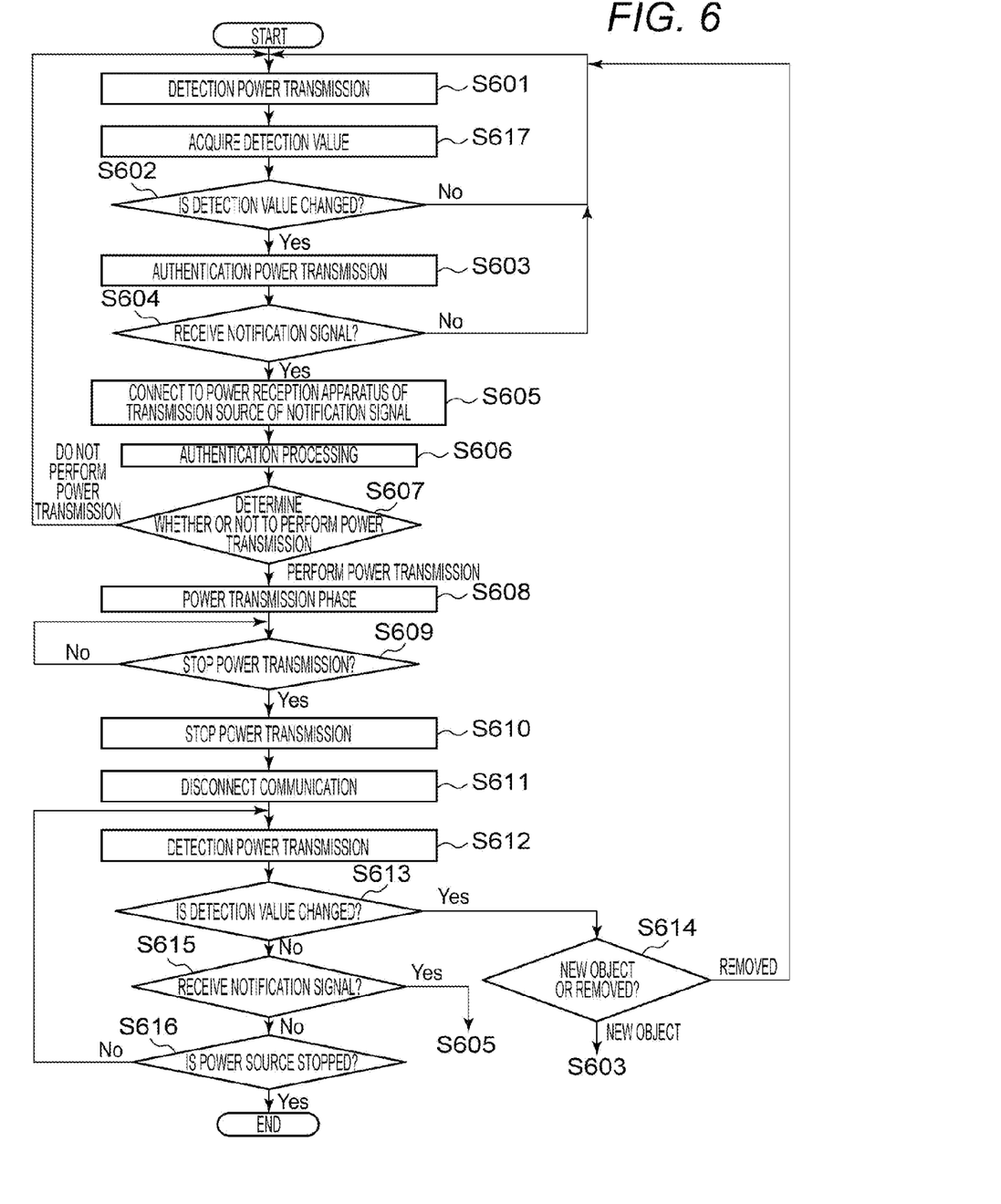
FIG. 6 is a flowchart showing an operation of the power transmission apparatus.

Next, an operation of the power transmission apparatus 210 of the present embodiment shown in FIG. 2 will be described with reference to a flowchart shown in FIG. 6. The flowchart shown in FIG. 6 is realized when the control unit 201 executes the control program stored in the memory 208 and performs calculation and processing of information and control of each hardware component. A part or all of steps shown in the flowchart shown in FIG. 6 may be realized by hardware such as, for example, ASIC.

When the power transmission apparatus 210 starts the operation, the power transmission unit 203 starts intermittent detection power transmission (S601). The control unit 201 acquires a detection value detected by the detection unit 204 at a detection power transmission time in S601 (S617). Then, the control unit 201 determines whether a variation occurs in a load impedance as seen from the power transmission apparatus 210 based on whether the detection result of the detection unit 204 at the detection power transmission time, which is acquired in S617, changes from that in the steady state (S602). The steady state is a state in which another device does not come close to or is not in contact with the power transmission apparatus 210. In FIG. 4, the power transmission apparatus starts the detection power transmission at time T0.

The control unit 201 detects that there is an object in the power transmittable range of the power transmission apparatus from the detection result of the detection unit 204. Specifically, when the power reception apparatus 320 is located in the power transmittable range of the power transmission apparatus 210, the power reception apparatus 320 receives consumption power according to the load of the power reception apparatus 320, so that the detection voltage of the detection unit 204 drops by a certain value. The consumption power according to the load of the power reception apparatus 320 is power required to operate the control unit 301 and the communication unit 302 and power that is merely consumed by the power reception antenna 303. When no variation occurs in the detection voltage of the detection unit 204, the control unit 201 returns to S601 again and repeatedly performs the detection power transmission. In FIG. 4, the power transmission apparatus 101 detects variation of the detection voltage of the detection unit 204 at time T2.

When a variation occurs in the detection voltage of the detection unit 204, the power transmission unit 203 starts the authentication power transmission that supplies power to cause the power reception apparatus 320 to transmit a response (S603). The authentication power transmission is different from the intermittent detection power transmission and is power transmission in which a constant power is continuously transmitted. The control unit 201 determines whether the control unit 201 has received the notification signal from the power reception apparatus 320 within a predetermined period of time (for example, 100 ms) after starting the authentication power transmission (S604). Whether the notification signal is the notification signal from the power reception apparatus 320 is determined by whether the received notification signal includes service information indicating that the wireless power transmission method corresponding to the present system can be performed. When the control unit 201 of the present embodiment receives the notification signal from the power reception apparatus 320 after starting the authentication power transmission, the control unit 201 can determine whether the object detected in S602 is the power reception apparatus. When the control unit 201 does not receive the notification signal, the control unit 201 stops the authentication power transmission, returns to S601 again, and performs the detection power transmission.

In S604, if it is determined that the notification signal is received from the power reception apparatus 320 within a predetermined period of time, the power transmission apparatus 210 continues the authentication power transmission. Then, the power transmission apparatus 210 transmits a connection request from the communication unit 206 to the transmission source of the notification signal received in S604, and wireless communication connection is established (S605). In FIG. 4, the power transmission apparatus 101 receives the notification signal (403-1) from the first power reception apparatus 102 within a predetermined period of time after starting the authentication power transmission (402-1). Then, the power transmission apparatus 101 transmits the connection request (404-1) to the first power reception apparatus 102 and wirelessly connects to the first power reception apparatus 102.

The communication unit 206 performs the authentication processing and communicates (exchanges) each other's capability information and information necessary for the power transmission with the power reception apparatus 320 that is wirelessly connected in S605 (S606). The power transmission apparatus 101 determines whether to perform power transmission to the power reception apparatus 320 through the authentication processing (S607). For example, when the power transmission apparatus 101 receives control information indicating that the power reception apparatus 320 does not start power reception from the power reception apparatus 320, the power transmission apparatus 101 determines not to perform the power transmission. When the power transmission apparatus 101 determines not to perform the power transmission, the power transmission apparatus 101 disconnects the communication with the power reception apparatus 320 and returns the processing to S601.

When the power transmission apparatus 101 determines to perform the power transmission, the power transmission unit 203 starts the wireless power transmission in the power transmission phase (S608). After the control unit 201 starts the power transmission, if the communication unit 206 receives a request for stopping the power transmission from the power reception apparatus 320, the control unit 201 determines to stop the power transmission (S609). When the control unit 201 determines to stop the power transmission, the power transmission apparatus 210 stops the power transmission to the power reception apparatus 320 which is the transmission source of the request for stopping the power transmission (S610) and disconnects the communication with the power reception apparatus (S611).

Next, the power transmission apparatus 210 moves to the detection phase in which the authentication power transmission is limited and causes the power transmission unit 203 to start intermittent detection power transmission (S612). Regarding the processing of S612, if the power transmission apparatus can transmit power to a plurality of power reception apparatuses, when there is at least one power reception apparatus in the power transmission phase, the power transmission phase may be continued, and only when there is no power reception apparatus in the power transmission phase, the processing of S612 may be performed.

The control unit 201 determines whether the detection result of the detection unit 204 at the detection power transmission time is changed from the detection result when detecting the power reception apparatus 320 to which the power transmission has been performed (S613). As compared with S602 described above, the detection result is not the detection result of the detection unit 204 at the detection power transmission time in the steady state, so that even when the power reception apparatus 320 to which the power transmission has been performed is detected, the authentication power transmission is limited and is not outputted. The power transmission apparatus 210 compares the detection value of the detection unit 204 at the detection power transmission time, which is acquired in S601 before the power transmission phase is started, and the detection value of the detection unit 204 at the detection power transmission time, which is acquired in S612 immediately after the power transmission phase ends. Here, when the change of the detection value is about zero or is smaller than a threshold value corresponding to one power reception apparatus, it is determined that only the power reception apparatus 320 to which the power transmission has been performed is located in the power transmission range, and the authentication power transmission is limited. When the change of the detection value is greater than the threshold value corresponding to one power reception apparatus, it is determined that the change of the detection value occurs.

When the change of the detection value of the detection unit 204 occurs, the power transmission apparatus 210 determines whether the change is generated by removing the power reception apparatus 320 to which the power transmission has been performed or by placing a new object in the power transmittable range (S614). The determination in S614 is performed according to increase or decrease of the detection value of the detection unit 204. When the detection value of the detection unit 204 increases (voltage rises) by more than the threshold value corresponding to one power reception apparatus, the power transmission apparatus 210 determines that the power reception apparatus 320 to which the power transmission has been performed is removed (moved to the outside of the power transmission range). When the detection value of the detection unit 204 decreases (voltage falls) to be less than the threshold value corresponding to one power reception apparatus, the power transmission apparatus 210 determines that the power reception apparatus 320 to which the power transmission has been performed and an object other than the power reception apparatus 320 are located in the power transmission range.

When the power transmission apparatus 210 determines that the power reception apparatus 320 to which the power transmission has been performed is removed from the power transmittable range, the power transmission apparatus 210 does not limit the authentication power transmission and restarts the processing from S601. On the other hand, when it is determined that a new object is placed, the power transmission apparatus 210 does not limit the authentication power transmission and performs the authentication power transmission in S603 to perform authentication processing with the new object.

In S613, when the detection result of the detection unit 204 at the detection power transmission time is not changed, the power transmission apparatus 210 determines whether a notification signal is received from the power reception apparatus 320 to which the power transmission has been performed (S615). In S615, when the notification signal is received, the power transmission apparatus 210 determines that recharge is required and performs recharge by performing the processing from S605. The power transmission apparatus 210 performs the detection power transmission in S612 as long as the power source is not stopped. When the power source is stopped, the power transmission apparatus 210 stops the processing (S616). The determination in S616 may be performed at any timing during the processing.

As described above, even when the power reception apparatus where the battery is fully charged by charge using the wireless power transmission and the power reception is completed is continuously arranged in the power transmittable range of the power transmission apparatus, the authentication power transmission is limited if it is not necessary to recharge the power reception apparatus.

In this way, unnecessary reconnection between the power reception apparatus and the power transmission apparatus is limited, so that the possibility of performing the authentication processing to perform unnecessary power transmission is reduced. Further, unnecessary processing is omitted, so that it is possible to reduce the power consumption of each device.

In the embodiment described above, it is described that when the power reception apparatus is continuously placed on the power transmission apparatus after the power transmission is stopped, the power transmission apparatus does not output the authentication power transmission to the power reception apparatus, so that the authentication power transmission is limited. However, in this case, the authentication power transmission may be limited by causing the power transmission apparatus to perform the authentication power transmission where the power value is lowered from a normal value. The power transmission apparatus performs the authentication power transmission where the power value is lowered from a normal value, so that when another power reception apparatus different from the power reception apparatus that is continuously placed enters the power transmission range, it is possible to more reliably perform the authentication processing with the other power reception apparatus while reducing the power consumption of the power transmission apparatus.

In the embodiment described above, it is described that the wireless power transmission is performed by placing the power reception apparatus on the power transmission apparatus. However, even when the power reception apparatus and the power transmission apparatus are spatially separated from each other, the wireless power transmission may be performed. For example, in the embodiment described above, it is possible to apply a case in which an electric vehicle which is a power reception apparatus performs the wireless power transmission with a power transmission apparatus built in a floor or a roadbed in a noncontact state.

According to the configuration of the present embodiment, it is possible to reduce the processing for the wireless power transmission.

OTHER EMBODIMENTS

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-233802, filed Nov. 18, 2014, which is hereby incorporated by reference herein in its entirety.

What is claimed is:

1. A power transmission apparatus that wirelessly transmits power, the power transmission apparatus comprising:
  a power transmission unit configured to perform authenticating power transmission, which is for supplying power necessary for authentication processing, in an authentication phase, and perform power transmission in a power transmission phase, in which it is possible to supply larger power than that of the authenticating power transmission;
  a detection unit configured to detect an object;
  an authentication unit configured to, upon detecting the object by the detection unit, cause the power transmission unit to perform the authenticating power transmission to the object, and execute, in the authentication phase, the authentication processing that includes determining whether the object detected by the detection unit is a power reception apparatus that is capable of receiving the power transmitted in the power transmission phase or not;
  a reception unit configured to receive a power transmission stop request that is a request for stopping the power transmission in the power transmission phase; and
  a control unit configured to, in a case where the power transmission in the power transmission phase is stopped in response to the power transmission stop request received by the reception unit from the object determined to be a power reception apparatus, cause the power transmission unit not to perform the authenticating power transmission even in a case where the object is detected by the detection unit.

2. The power transmission apparatus according to claim 1, further comprising:
  a determination unit configured to determine whether the object determined to be a power reception apparatus moves outside a power transmission range of the power transmission unit,
  wherein the control unit controls the authentication unit so that the authentication unit does not perform the authentication processing in a period from when the authenticating power transmission is stopped to when the determination unit determines that the object moves outside the power transmission range and the detection unit detects another object different from the object.

3. The power transmission apparatus according to claim 2, wherein
  the control unit detects that the object determined to be a power reception apparatus moves outside the power transmission range based on at least one of a detection value of a voltage value, a current value, a power value, or an impedance, which are detected according to execution of detection power transmission performed by the power transmission unit after the power transmission is stopped according to reception of the power transmission stop request.

4. The power transmission apparatus according to claim 2, wherein
  the detection unit detects a power reception apparatus based on at least one of a detection value of a voltage value, a current value, a power value, or an impedance, which are detected according to execution of detection power transmission performed by the power transmission unit and stores the detection value used when detecting the power reception apparatus, and
  the control unit detects that the object determined to be a power reception apparatus moves outside the power transmission range based on a difference between a detection value detected according to execution of detection power transmission performed by the power transmission unit after the power transmission is stopped according to reception of the power transmission stop request and the stored detection value.

5. The power transmission apparatus according to claim 1, wherein
the detection unit detects an object based on at least any one of a voltage value, a current value, a power value, or an impedance, which are detected according to execution of detection power transmission performed by the power transmission unit.

6. The power transmission apparatus according to claim 1, wherein
the authentication unit communicates capability information including at least either an amount of power or a power transmission method with the object determined to be the power reception apparatus.

7. The power transmission apparatus according to claim 1, wherein the control unit causes the power transmission unit to resume the authenticating power transmission in a case where another object different from the object is detected by the detection unit.

8. A control method for controlling a power transmission apparatus that wirelessly transmits power, the control method comprising:
a power transmission step of performing authenticating power transmission, which is for supplying power necessary for authentication processing, in an authentication phase, and performing power transmission in a power transmission phase, in which it is possible to supply larger power than that of the authenticating power transmission;
a detection step of detecting an object;
an authentication step of, upon detecting the object by the detection step, causing the power transmission apparatus to perform the authenticating power transmission to the object, and executing, in the authentication phase, the authentication processing that includes determining whether the object detected by the detection step is a power reception apparatus that is capable of receiving the power transmitted in the power transmission phase or not;
a reception step of receiving a power transmission stop request that is a request for stopping the power transmission in the power transmission phase; and
a control step of, in a case where the power transmission in the power transmission phase is stopped in response to the power transmission stop request received by the reception step from the object determined to be a power reception apparatus, causing the power transmission apparatus not to perform the authenticating power transmission even in a case where the object is detected by the detection step.

9. The control method according to claim 8, further comprising:
a determination step of determining whether the object determined to be a power reception apparatus by the authentication step moves outside a power transmission range of the power transmission apparatus,
wherein the control step controls so that the authentication processing is not performed in the authentication step in a period from when the authenticating power transmission is stopped to when the determination step determines that the object moves outside the power transmission range and the detection step detects another object different from the object.

10. The control method according to claim 9, wherein
the control step detects the object determined to be a power reception apparatus by the authentication step moves outside the power transmission range based on at least one of a detection value of a voltage value, a current value, a power value, or an impedance, which are detected according to execution of detection power transmission after the power transmission is stopped according to reception of the power transmission stop request.

11. A non-transitory computer-readable storage medium storing computer executable instructions for causing a computer in a power transmission apparatus to execute a process comprising:
a power transmission step of performing authenticating power transmission, which is for supplying power necessary for authentication processing, in an authentication phase, and performing power transmission in a power transmission phase, in which it is possible to supply larger power than that of the authenticating power transmission;
a detection step of detecting an object;
an authentication step of, upon detecting the object by the detection step, causing the power transmission apparatus to perform the authenticating power transmission to the object, and executing, in the authentication phase, the authentication processing that includes determining whether the object detected by the detection step is a power reception apparatus that is capable of receiving the power transmitted in the power transmission phase or not;
a reception step of receiving a power transmission stop request that is a request for stopping the power transmission in the power transmission phase; and
a control step of, in a case where the power transmission in the power transmission phase is stopped in response to the power transmission stop request received by the reception step from the object determined to be a power reception apparatus, causing the power transmission apparatus not to perform the authenticating power transmission even in a case where the object is detected by the detection step.

12. The non-transitory computer-readable storage medium according to claim 11, wherein the process further comprises:
a determination step of determining whether the object determined to be a power reception apparatus by the authentication step moves outside a power transmission range of the power transmission apparatus,
wherein the control step controls so that the authentication processing is not performed in the authentication step in a period from when the authenticating power transmission is stopped to when the determination step determines that the object moves outside the power transmission range and the detection step detects another object different from the object.

13. The non-transitory computer-readable storage medium according to claim 12,
wherein the control step detects that the object determined to be a power reception apparatus by the authentication step moves outside the power transmission range based on at least one of a detection value of a voltage value, a current value, a power value, or an impedance, which are detected according to execution of detection power transmission after the power transmission is stopped according to reception of the power transmission stop request.

* * * * *